United States Patent

McNaughton et al.

[11] Patent Number: 5,161,833
[45] Date of Patent: Nov. 10, 1992

[54] POSITIVE TRANSITION QUICK CONNECT COUPLING

[75] Inventors: James McNaughton, Rochester; Angelo Pacitto, Mt. Clemens, both of Mich.

[73] Assignee: Huron Products Industries, Inc., Mt. Clemens, Mich.

[21] Appl. No.: 751,196

[22] Filed: Aug. 29, 1991

[51] Int. Cl.⁵ ............................................. F16L 39/00
[52] U.S. Cl. ..................................... 285/319; 285/921
[58] Field of Search .................. 285/319, 921, 351, 423

[56] References Cited

U.S. PATENT DOCUMENTS

| | | | |
|---|---|---|---|
| 4,936,544 | 6/1990 | Bartholomew | 285/319 X |
| 4,943,091 | 7/1990 | Bartholomew | 285/319 X |
| 4,946,205 | 8/1990 | Washizu | 285/319 |
| 5,002,315 | 3/1991 | Bartholomew | 285/921 X |

Primary Examiner—Dave W. Arola
Attorney, Agent, or Firm—Kinzer, Plyer, Dorn, McEachran & Jambor

[57] ABSTRACT

A unique quick connect fluid coupling is disclosed in which a tube inner end does not contact a seal if the tube is not fully connected. Preferably, a retainer retains the tube within the bore. The retainer is of the avalanche type such that a high force is required to insert the tube, and once this high force is overcome the momentum of the tube carries it to its fully inserted position. No seal is formed between the tube and seals within the housing unless the tube has moved beyond the point where the high force begins. Once the tube has moved beyond that point, it will be fully connected. The invention ensures that there would be no seal between a tube and a housing unless the tube is fully connected.

6 Claims, 3 Drawing Sheets

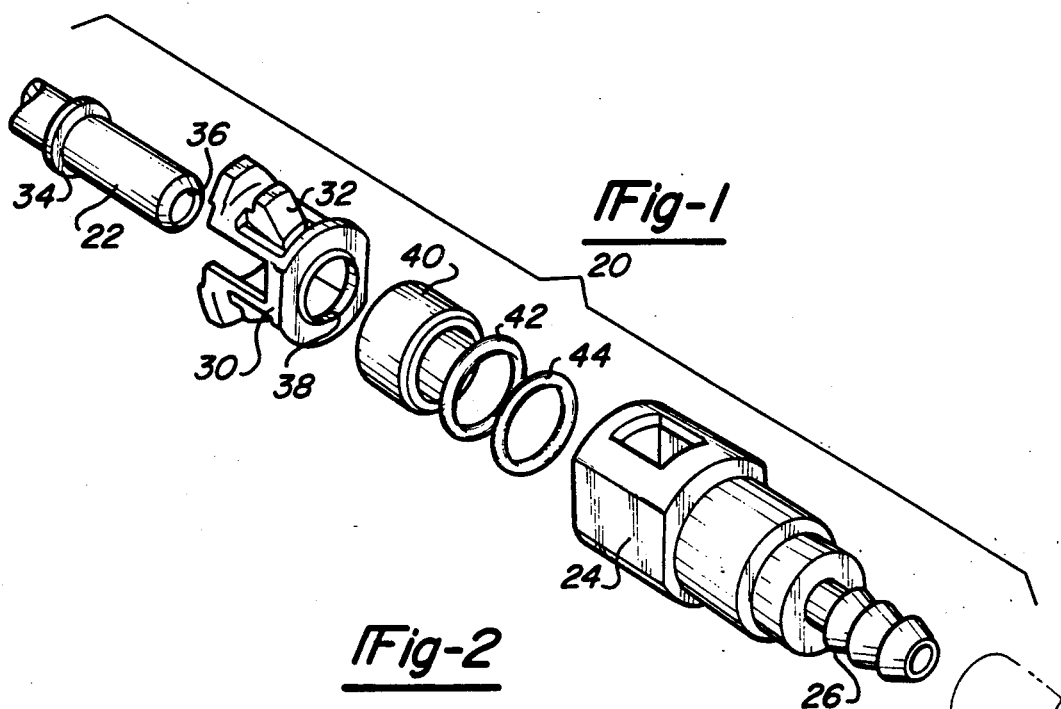
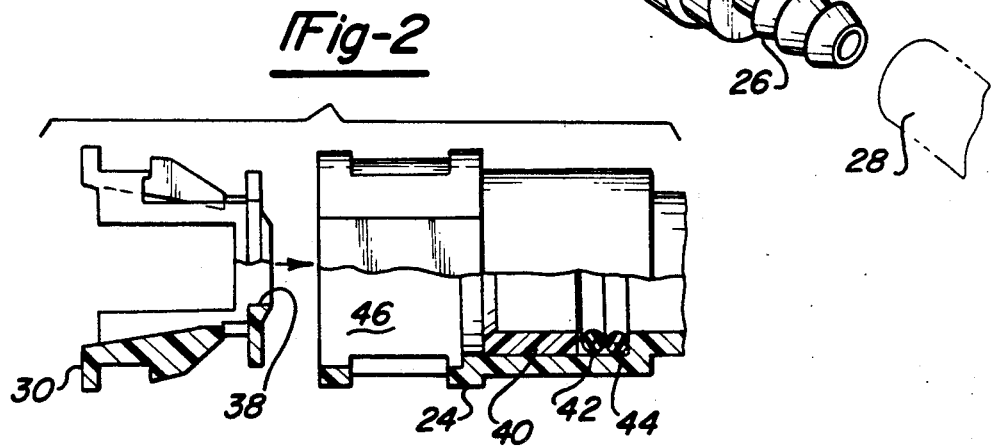
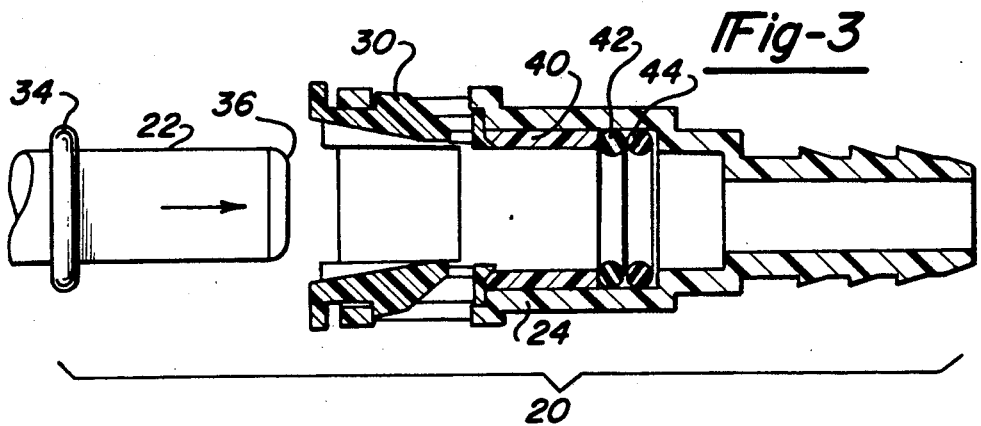

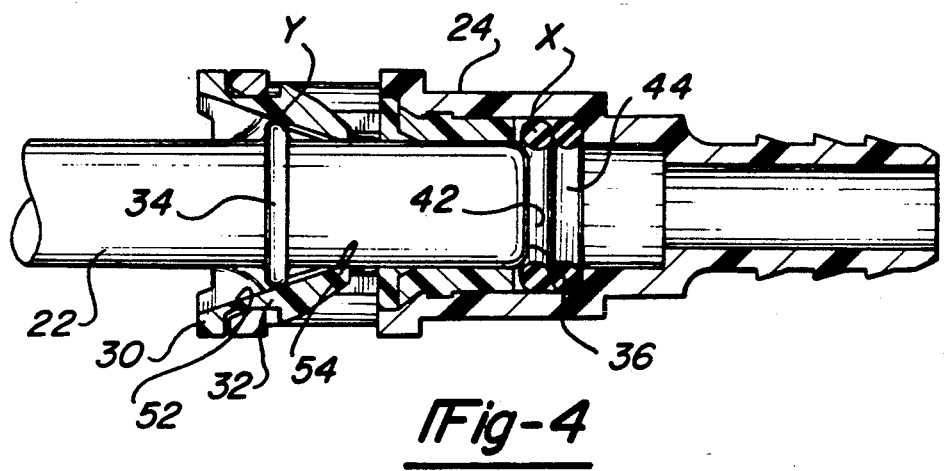
_Fig-4_
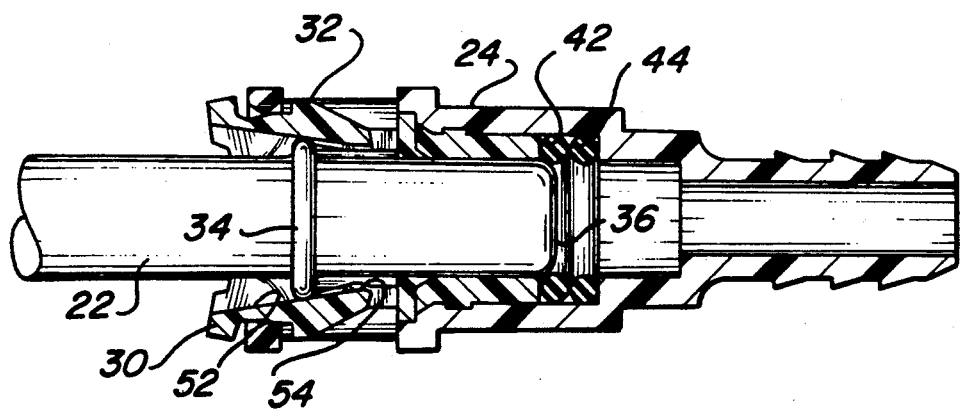
_Fig-5_

POSITIVE TRANSITION QUICK CONNECT COUPLING

BACKGROUND OF THE INVENTION

This application relates to a quick connect fluid coupling which ensures that a tube is not sealed unless the tube is fully inserted into a connector structure.

Quick connect fluid couplings are well known in the art and used to quickly connect a tube to a housing or second tube. Several quick connect couplings are utilized in most modern vehicles to connect brake lines, air conditioning lines, power steering lines and other high pressure lines to a housing, or second tube.

A particularly successful prior art coupling consists of a spring or retainer received within a female housing bore. The retainer has a plurality of arms which extend radially inwardly in a direction moving axially into the bore. The tube has a radially greater upset portion which moves into the bore and abuts an inner peripheral surface of the arms. The axially and radially innermost ends of the arms define an inner diameter approximately equal to the outer diameter of the tube at locations other than the upset portion. As the tube is inserted further into the bore, the upset portion forces the arms radially outwardly, and moves axially past the arms. Once the upset portion has moved axially beyond the arms, the arms spring back to a position where they are radially outwardly of the tube, and axially between the upset portion of the tube an outer end of the bore. The tube is then fully inserted, and the retainer securely retains the tube within the housing.

In one prior art coupling, the retainer is of a so-called "avalanche" type where the force required to insert the tube into the housing is at a first relatively low point for initial axial insertion, and then rises sharply to a relatively high point after the upset portion initially contacts the inner periphery of the arms. The point where this high required force begins is defined as an "avalanche" point. Once an operator has supplied sufficient force to overcome this high required force, the momentum carries the tube further axially inwardly and ensures that it is fully inserted.

Problems are sometimes encountered with this type of quick connect coupling since a tube inner end is at an axial position where it is aligned with seals in the housing prior to reaching the avalanche point. The seals engage the outer periphery of the tube and provides some resistance to further insertion of the tube. This may give a false impression or feel to the assembler that the high required force may have been overcome. Thus, the prior art has sometimes resulted in an assembler misinterpreting this feel as an indication that the tube is fully inserted. Further, if an assembler neglects to fully insert the tube for whatever reason, it is still possible that the prior art couplings will provide a seal between the tube and the housing.

It is undesirable for the tube not to be fully inserted since it could become disconnected in use. This is particularly true when the tube is used in a vehicle. With the prior art structure discussed above, should the tube not be fully inserted within the housing, a seal may still be provided between the housing and the tube. The seal may be adequate for a period of time until the vehicle has driven off the assembly line and away from the factory. The fluid pressure in the line, vibration or temperature cycling, will eventually cause the tube to become disconnected from the housing. It is far more preferable for the improper connection to be identified before the vehicle leaves the assembly line.

SUMMARY OF THE INVENTION

In a disclosed embodiment a quick connect fluid coupling does not provide a seal between a tube and a housing until the tube has moved beyond a point where it will be fully inserted. In one disclosed embodiment, a required tube insertion force begins at a low level, then increases sharply to a relatively high level at a first axial position. Once this relatively high level of force is overcome, momentum carries the tube to its fully inserted position. The axially innermost end of the tube is not received within a seal in the housing until the tube passes this first axial position. Thus, no false feel is given to an operator that the tube is fully inserted. Moreover, if the tube is not fully inserted there is no seal. If the vehicle is moved off of an assembly line, the high pressure fluid will noticeably leak.

The tube preferably has a radially greater upset portion spaced from an inner axial end. The retainer preferably has a number of resilient arms which extend radially inwardly from an outer end of the bore axially into the bore. The tube is inserted until the upset end initially contacts an inner peripheral surface of these arms. This initial insertion is the low level required force discussed above. This point is the first axial position, or avalanche point. Further insertion of the tube requires the upset portion to bias the arms radially outwardly, which requires the sharply increased tube insertion force.

As the tube moves beyond the avalanche point, the upset portion of the tube begins to bias the arms radially outwardly. The axially innermost end of the tube may then move into a first seal. As noted above, once this avalanche point is passed, the momentum of the tube carries it to its fully assembled position. Thus, it is desirable that the seal begin contacting the tube soon after the avalanche point is passed.

Further, any resistance to the tube insertion from the seal will occur within the area where the sharply increased force is provided. Thus, the resistance from the seal will be easily overcome, and will not provide a false feel to an operator.

In a most preferred embodiment of the present invention, the axially innermost end of the tube is adjacent to the axially outermost end of a first seal when the tube reaches this avalanche point. This preferred alignment of the seal and axial end of the tube results in the greatest amount of sealing possible, while still not providing a seal until the tube is fully inserted.

These and other objects and features of the present invention can be best understood from the following specification and drawings of which the following is a brief description.

BRIEF DESCRIPTION OF THE DRAWINGS

FIG. 1 is an exploded perspective view of a construction embodying the present invention.

FIG. 2 is a cross-sectional view of a portion of the construction shown in FIG. 1.

FIG. 3 is a cross-sectional view of the construction shown in FIG. 1.

FIG. 4 is a view similar to FIG. 3.

FIG. 5 is a view similar to FIG. 4.

DETAILED DESCRIPTION OF A PREFERRED EMBODIMENT

Figure 6:
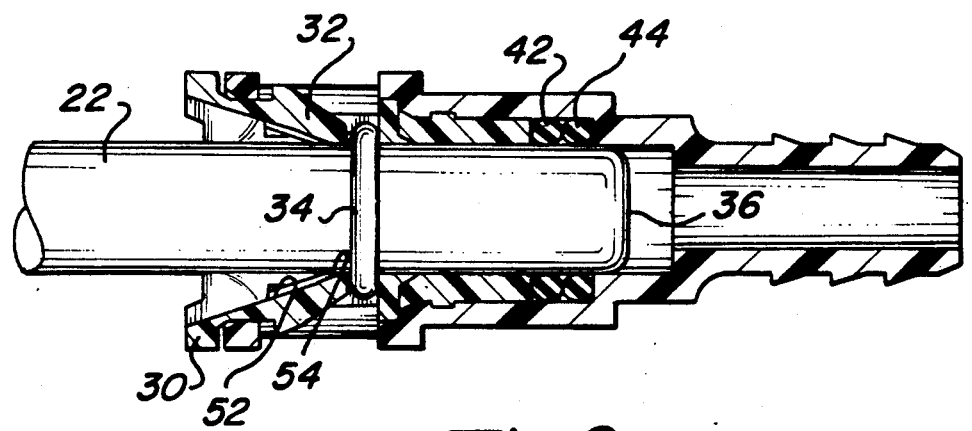
FIG. 6 is a view similar to FIG. 5.

FIG. 1 discloses a quick connect fluid coupling 20 for connecting a tube 22 within a housing 24. Housing 24 has structure 26 at a downstream end to be connected to a downstream tube 28.

A retainer 30 is inserted within housing 24 and includes a plurality of arms 32 which extend radially inwardly to abut an upset portion 34 of tube 22. Upset portion 34 is of a greater radial outer diameter than portions on either axial side of upset portion 34. An inner tube end 36 extends through an opening 38 in retainer 32, through spacer 40, and sealingly engages O-ring seals 42 and 44 to provide a fluid tight seal between tube 22 and housing 24.

As shown in FIG. 2, retainer 30 is inserted within bore 46 in housing 24. Bushing 40 and O-rings 42 and 44 are positioned in bore 46 axially inwardly of retainer 30.

As shown in FIG. 3, coupling 20 is assembled by inserting tube 22 into bore 46. Inner end 36 will eventually sealingly engage seals 42 and 44.

As shown in FIG. 4, tube 22 may be easily inserted into bore 46 until upset portion 34 initially contacts an inner peripheral surface of an arm 32. An outermost O-ring 42 is centered at a first axial position x. The location y on the inner periphery of arms 32 which upset portion 34 initially contacts is defined as a second axial position. The distance x-y between the first and second axial positions is greater than the distance between upset portion 34 and inner end 36 of tube 22. Thus, when upset portion 34 initially contacts the inner peripheral surface of arms 32, inner end 36 does not sealingly engage the outermost seal 42. At this point there is no seal provided between tube 22 and housing 24.

The point where upset portion 34 reaches second axial position y is known as the avalanche point. Up to this point the insertion force was low, it will now increase sharply.

As tube 22 continues to be inserted, upset portion 34 begins to bend arms 32 radially outwardly. This is known as the positive transition zone and is illustrated in FIG. 5. A sharply increased force is required over the force required to insert tube 22 to the position shown in FIG. 4. As upset portion 34 is biasing arms 32 radially outwardly, inner end 36 of tube 22 begins to move within O-rings 42 and 44 and is sealingly engaged within housing 24.

Thus, as tube 22 is moving through the positive transition zone where the sharply increased force is required inner end 36 is also being forced into seals 42 and 44. Any resistance to insertion of tube 22 from seals 42 and 44 will occur during this sharply increased force zone, and thus the resistance by the seals will not provide any false feel to an assembler.

As shown in FIG. 5, a first radially inwardly inclined surface 52 is formed on arms 32 and extends to a second surface 52 which is formed at an angle generally parallel to the axis of the bore. Once upset portion 34 reaches the apex between portions 52 and 54, the force resisting insertion of tube 22 decreases rapidly. Upset portion 34 then snaps beyond second inclined portion 54 into a fully inserted position.

The force required to move tube 22 beyond the initial avalanche point, such as shown in FIG. 4, and through the positive transition zone, shown in FIG. 5, carries tube 22 to its fully inserted position shown in FIG. 6.

Tube 22 is now fully inserted into housing bore 46. Upset portion 34 is received axially inwardly of an axially innermost end of arms 32. Tube 22 is securely retained within housing 24. Moreover, the axially inner end 36 of tube 22 is received radially inwardly of seals 42 and 44 providing a fluid tight seal.

As illustrated in FIGS. 4 and 5, when tube 22 has upset portion 34 at the second axial position y, or avalanche point, inner end 36 is spaced slightly from seals 42. Inner end 36 is beveled, and a portion of its beveled surface is axially aligned with an axially outer portion of outermost seal 42. Seal 42 is still spaced radially from inner end 36.

Once upset portion 34 begins to bias arms 32 radially outwardly into the positive transition zone, as shown in FIG. 5, inner end 36 immediately contacts the outermost seal 42. As shown in FIG. 6, once fully inserted inner end 36 is spaced axially inwardly from the outermost seal 42 by the maximum distance that still provides no seal until upset portion 34 moves into the positive transition zone.

A preferred embodiment of the present invention has been disclosed, however, a worker of ordinary skill in the art would recognize that certain modifications would come within the scope of this invention. Thus, the following claims should be studied in order to determine the true scope and content of the invention.

We claim:

1. A quick connect tubing connector comprising:
   a tube extending along an axis, having a first outer diameter over the majority of an axial length, and having at least one upset portion of a greater radially outer dimension at one axial position, said one axial position being spaced from an inner axial end of said tube by a first distance;
   a body defining a bore to receive said tube, said bore extending from an outer end axially inwardly, a retainer means positioned within said bore for retaining said tube within said bore, at least one seal positioned within said bore, said at least one seal being centered at a first axial position;
   said retainer means consisting of a plurality of resilient arms extending axially and radially inwardly from an axially outer end of said bore, said resilient arms having an inner peripheral surface with a greatest inner diameter that is greater than the outer diameter of said upset portion, and a smallest inner diameter smaller than the outer radially dimension of said upset portion, said resilient arms resisting insertion of said tube into said bore after said upset portion reaches a second axial position where it initially abuts an inner peripheral surface of said arms having an inner diameter intermediate said greatest and smallest inner diameters, and approximately equal to the outer diameter of said upset portion, the distance between said first and second axial positions being approximately equal to said first distance such that said inner axial end of said tube does not sealingly engage said at least one seal when said upset portion is at said second axial location; and
   said inner axial end of said tube being beveled, and said inner axial end being aligned with an axially outer portion of said at least one seal, such that said axially outer portion of said at least one seal being spaced radially outwardly of said inner axial end of said tube when said upset portion is at said second axial position, and such that a plane could be drawn normal to the axis of said tube and extending through said seal and said axially inner end of said tube.

2. The connector as recited in claim 1, wherein said at least one seal being an axially outermost seal, and there being at least one additional seal spaced axially inwardly from said axially outermost seal.

3. A quick connect tubing connector comprising:

a tube extending along an axis and having an axially inner end;

a body defining a bore to receive said tube, said bore extending axially inwardly from an outer end, a retainer means positioned within said bore for retaining said tube within said bore, at least one seal positioned within said bore, said at least one seal being centered at a first axial position; and said retainer means providing a force resisting insertion of said tube into said bore until said tube reaches a position where it is fully inserted into said bore, after which said retainer means retains said tube within said bore, said force from said retainer means resisting insertion of said tube being initially at a relatively low level for a first portion of the axial insertion of said tube, said resistance increasing sharply to a second higher level when said tube reaches a second axial position in said bore, and the momentum from said tube carrying said tube further into said bore such that it is fully inserted after said sharply increased force is overcome, said axially inner end of said tube not contacting said seal before said tube is at said second axial position, said retainer means being constructed such that once said tube moves beyond said second axial position, said tube will necessarily move to said fully inserted position, and not remain in any intermediate positions.

4. The connector as recited in claim 3, wherein said axially inner end of said tube being adjacent to an axially outermost portion of said at least one seal when said tube is at said second axial position.

5. The connector as recited in claim 4, wherein said axially inner end of said tube being beveled such that it has a smaller outer radial dimension than portions of said tube spaced axially outwardly, and said axially inner end being aligned with said axially outermost portion of said at least one seal, said axially outermost portion of said at least one seal being spaced radially outwardly of said axially inner end of said tube when said tube is at said second axial position such that said axially inner end of said tube does not contact said seal until said upset portion has moved inwardly of said second axial portion, and such that a plane could be drawn normal to the axis of said tube and extending through said seal and said axially inner end of said tube.

6. The connector as recited in claim 3, wherein said retainer means having a plurality of resilient arms extending axially and radially inwardly from an outer end of said bore, said tube having an upset portion of an outer diameter greater than the nominal outer diameter of said tube, said resilient arms having inner peripheral surface with a greatest inner diameter that is greater than the outer diameter of said upset portion, and a smallest inner diameter which is smaller than the outer diameter of said upset portion, said resilient arms resisting insertion of said tube to said bore to apply said resistance force, said resilient arms having axially inner ends which define a surface lying generally in a plane perpendicular to said axis, and said axially inner ends abutting an outer face of said upset portion to define said fully inserted position.

* * * * *